(12) United States Patent
Christensen et al.

(10) Patent No.: US 6,633,864 B1
(45) Date of Patent: Oct. 14, 2003

(54) METHOD AND APPARATUS FOR MULTI-THREADED BASED SEARCH OF DOCUMENTS

(75) Inventors: Carol Sue Christensen, Austin, TX (US); Janice Marie Girouard, Austin, TX (US); Nizamudeen Ishmael, Jr., Austin, TX (US); Richard Dennis Talbot, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/303,362

(22) Filed: Apr. 29, 1999

(51) Int. Cl.[7] .............................................. G06F 17/30
(52) U.S. Cl. ................... 707/3; 707/7; 707/10
(58) Field of Search ........................ 707/10, 2, 1, 104.1, 707/101, 102, 100, 5, 3; 379/265; 709/201, 102, 203; 345/347

(56) References Cited

U.S. PATENT DOCUMENTS

| | | | | |
|---|---|---|---|---|
| 5,623,652 A | * | 4/1997 | Vora et al. .................. 395/610 |
| 5,778,368 A | * | 7/1998 | Hogan et al. .................. 707/10 |
| 5,933,144 A | * | 8/1999 | Alcorn ........................ 345/347 |
| 5,974,135 A | * | 10/1999 | Breneman et al. .......... 379/265 |
| 5,978,940 A | * | 11/1999 | Newman et al. ............. 714/712 |
| 5,991,751 A | * | 11/1999 | Rivette et al. .................. 707/1 |
| 6,006,252 A | * | 12/1999 | Wolfe .......................... 709/203 |
| 6,055,526 A | * | 4/2000 | Ambroziak ..................... 707/2 |
| 6,167,428 A | * | 12/2000 | Ellis ............................. 709/201 |
| 6,275,983 B1 | * | 8/2001 | Orton et al. ..................... 717/5 |
| 6,360,205 B1 | * | 3/2002 | Iyengar et al. .................. 705/5 |

* cited by examiner

Primary Examiner—Jean M. Corrielus
Assistant Examiner—Tam V Nguyen
(74) Attorney, Agent, or Firm—Duke W. Yee; Mark E. McBurney; Stephen J. Walder, Jr.

(57) ABSTRACT

A method and apparatus in a data processing system for searching for documents. A first thread is initiated, wherein the first thread provides an interface with a user to manipulate the results returned by the second thread. A search request is received. A second thread is initiated, wherein the second thread performs a search using the search request and stored in the results in a data structure and wherein the first thread and the second thread are executed in parallel in the data processing system.

31 Claims, 11 Drawing Sheets

```
//This for loop will update the screen.
    for (int i = 0; i<maxItems; i++) { y += normalHeight;

y1Loc[i] = y - fm.getMaxAscent();;
    y2Loc[i] = y + fm.getMaxDescent();
    x1Loc[i] = x+1;
    x2Loc[i] = x1Loc[i] + fm.stringWidth(urlTitles[i].getText()+1);             }──900

// determine the background color
    urlNo = (pageNo*10) + i;
//This portion of the code will change the color of the URL to another
//color so a person will know that they have already visited its location.
        if (visited[urlNo])
            g.setColor(VisitedColor);
        else                                                                    }──902
            g.setColor(UnvisitedColor);
//End of visit or change URL color code.

//puts url titles on screen
//This portion of the code will check the files[i] array which is
//updated by the SearchThread(handleSearch method in this code)
        if ((urlNo+1)<=docsFound) {
            g.setFont(smallerFont);
//The g.drawString method puts the items on the screen
            g.drawString(urlTitles[i].getText(),(x1Loc[i]-70), y+10);
            urlValid [i] = true;
        }
        else {
            urlValid [i] = false;
        } if ( urlValid[i] && (fm.stringWidth(urlTitles[i].getText()) == 0) ){ x2Loc[i] = x1Loc[i] + fm.stringWidth(files[i]);
            g.setFont(smallerItalicFont);                                       }──904
//The g.drawString method puts the items on the screen
            g.drawString(files[i], x1Loc[i], y);
            g.drawLine( x1Loc[i], y2Loc[i], x2Loc[i], y2Loc[i] );
        }
    }
//End of check file. This is then repeated for the next item.
```

*FIG. 9*

```
//This is the code that checks for the search button being
//pressed. The search button on the GUI.
    if ( s.equals(searchButtonText) ) {
      zeroLabels();
      //System.out.println("About to start thread");
      stop();
      //System.out.println("searchThread in action = " + searchThread);
      if ( searchThread == null ) {
        searchThread = new SearchThread(this);
        //System.out.println("thread started" );
        searchThread.start();
      }
      repaint();
      return true;
    }
//End of checking for the search button being pressed.
```
⎬ 1000

```
//This is the code that checks for the stop button being pressed
    if ( s.equals(stopButtonText) ) {
      stop();
      StopComL.setText( searchStopText );
      getAppletContext().showStatus( searchStopText );
      if (docsFound == 0) {
        ItemsFoundL.setText( zeroFound );
      }
      searchStatus = false;
      repaint();
      return true;
    }
//End of stop button being pressed.
```
⎬ 1002

```
//This is the code that checks for the previous button being pressed
    if ( s.equals(prevText) ) {
      pageBack();
      return true;
    }
//End of previous button being pressed.
```
⎬ 1004

```
//This is the code that checks for the next button being pressed
    if ( s.equals(nextText) ) {
      pageForward();
      return true;
    }
```
⎬ 1006

*FIG. 10A*

```
//This method picks up keyboard events. When a keyboard key is
//pressed this method is called to handle it.
   public boolean keyUp(Event evt, int key) {
```
⎫
⎬ 1008
⎭

```
//When the keyboard ENTER key is pressed, this method is called.
    case Event.ENTER:
      if ( keyboardEnter == true ) {
       zeroLabels();
       stop();
       if ( searchThread == null ) {
         searchThread = new SearchThread(this);
         searchThread.start();
       }
       repaint();
      }
      break;
//End of ENTER key code.
```
⎫
⎬ 1010
⎭

```
//This is the Esc key code.
    case Event.ESCAPE:
      stop();
      getAppletContext().showStatus("Search Stopped");
      searchStatus = false;
      StopComL.setText( searchStopText );
      if(docsFound == 0) {
      ItemsFoundL.setText( zeroFound );
      }
      repaint();
      break;
//End of the Esc key code.
```
⎫
⎬ 1012
⎭

```
//This method handles mouse movements.
//It changes the pointer from an arrow to a hand or the other way.
    public boolean mouseMove (Event e, int x, int y) {
```
⎫
⎬ 1014
⎭

```
//This method handles the mouse clicked events.
//If the click happens over a URL on the screen, then
//the URL is sent to another Browser window to view.
    public boolean mouseUp (Event e, int x, int y) {
```
⎫
⎬ 1016
⎭

FIG. 10B

```
//This line starts the Search Thread/File Processing
    searchThread.start();
```
⎫ 1100

```
//This code actually starts the Search Thread.
//Is will call the handleSearch() method
//form the search.rtf file and run it in
//a separate process
   public void run() {
     Search.handleSearch();
//When the method has finished searching
/all the specified files, then is stops.
     Search.searchThread.stop();
   }
```

End of code from SearchThread.rtf

⎫ 1102

```
//This code will create an array of all the file names.
   for (int dirNo = 0; dirNo<maxDirs; dirNo++) {

String fileNames[];

//read in search dir from the html
     if ( dirNo == 0 )
        searchDir = getParameter("BaseSp_Welcome");
     else
        searchDir = getParameter("DIR_"+dirNo);
     System.out.println(searchDir);

if (searchDir == null) continue;
     if (searchDir.equals("")) continue;

// make sure the search dir ends in a back slash character
     if ((searchDir.length() - 1) !=searchDir.lastIndexOf("/") )
        searchDir = searchDir + "/";

// identify all of the files within the directory
     try {
       dir = new File(searchDir);
     } catch (Exception e) {
       getAppletContext().showStatus(
             "Unable to read directory" + searchDir);
       return;
     }
     fileNames = dir.list();
```

```
//This line will call the DocSearch method which will open the file and parse
through the contents.
        found = DocSearch(dirNo, searchDir + thisFile, t1, t2, t3, caseSensitive);

//This method will call the correct method depending on which case
//was selected on the screen
    private boolean DocSearch (int dirNo, String oFileName,
            String oPattern1, String oPattern2, String oPattern3,
            boolean caseSensitive) {

//This is the method that actually opens the file and parses through
//the contents. If a match is found then true is returned
//otherwise false is returned.
    private boolean searchFile(int dirNo, String oFileName,
            String oPattern, boolean caseSensitive) {
```
} 1106

```
//This is where the files[i] array is updated.
        files[docsFound] = searchForTitle(searchDir + thisFile);
        if(files[docsFound].length()==0)
            files[docsFound] = "(" + searchDir + thisFile + ")";
```
} 1108

```
//This while loop will run until all the files in the
//fileNames[] array are search.
        while (i<=fileNames.length) {
```
} 1110

*FIG. 11B*

METHOD AND APPARATUS FOR MULTI-THREADED BASED SEARCH OF DOCUMENTS

BACKGROUND OF THE INVENTION

1. Technical Field

The present invention relates generally to an improved data processing system and in particular to an improved method and apparatus for performing data searches. Still more particularly, the present invention provides a method and apparatus for searching for data using a browser.

2. Description of Related Art

Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser. The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Users exploring the Web have discovered that the content supported by HTML document format on the Web was too limited. Users desire an ability to access applications and programs, but applications were targeted towards specific types of platforms. As a result, not everyone could access applications or programs. This deficiency has been minimized though the introduction and use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded.

Java# is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

The Java virtual machine (JVM) is a virtual computer component that resides only in memory. The JVM allows Java programs to be executed on different platforms as opposed to only the one platform for which the code was compiled. Java programs are compiled for the JVM. In this manner Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

A development environment, such as the Java Development Kit (JDK) available from Sun Microsystems, Inc., may be used to build Java bytecode from Java language source code and libraries. This Java bytecode may be stored as a Java application or applet on a Web Server, where it can be downloaded over a network to a user's machine and executed on a local JVM.

The Java run-time environment is specifically designed to limit the harm that a Java application can cause to the system that it is running on. This is especially important with the World Wide Web, where Java applets are downloaded and executed automatically when a user visits a Web page that contains Java pplets. Normally one would not want to execute random programs, they might contain viruses, or they might even be potentially malicious themselves and not merely carrying unwelcome code unintentionally. Unless the user specifically allows it (by setting the appropriate flags in the user-interface to the JVM), a Java applet cannot read or write to attached storage devices (except perhaps to a specific, restricted area), nor can it read or write to memory locations (except to a specific, restricted area).

Not only are Java applets designed for downloading over the network, standard Java libraries also specifically support client-server computing. The Java language includes provisions for multi-threading and for network communications. Compared to other languages (such as C), it is much easier to write a pair of programs, one executing locally on the user's computer that is handling the user-interaction, and the other executing remotely on a server, which is performing potentially more sophisticated and processor-intensive work.

Presently, Web-based searches whether for files located locally or for files located on an intranet or on the World Wide Web do not allow user interaction with the browser until all files are searched. In particular, the user would be unable to interact with the graphical user interface for the browser until a result was returned.

Therefore, it would be advantageous to have an improved method and apparatus for searching for files or other documents.

SUMMARY OF THE INVENTION

The present invention provides a method, apparatus, and instructions for searching for files or documents using a graphical user interface. In particular, the present invention provides a graphical user interface thread and a search thread in which both threads execute to perform searching and presentation of searches to a user. The search thread is used to handle the searching and processing of files while the graphical user interface thread allows the user to interact with the graphical user interface while files are being processed by the search thread.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
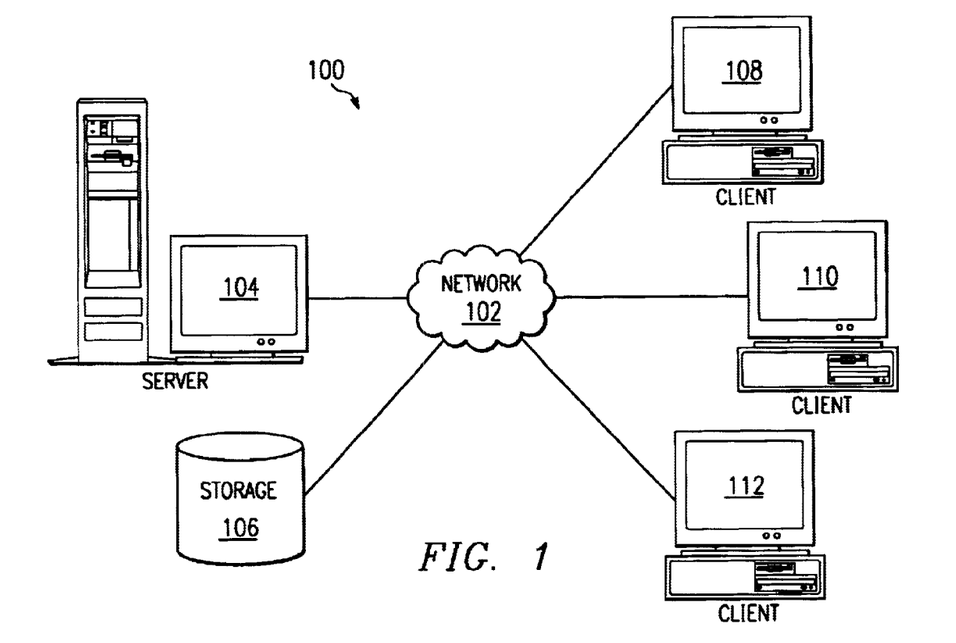
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
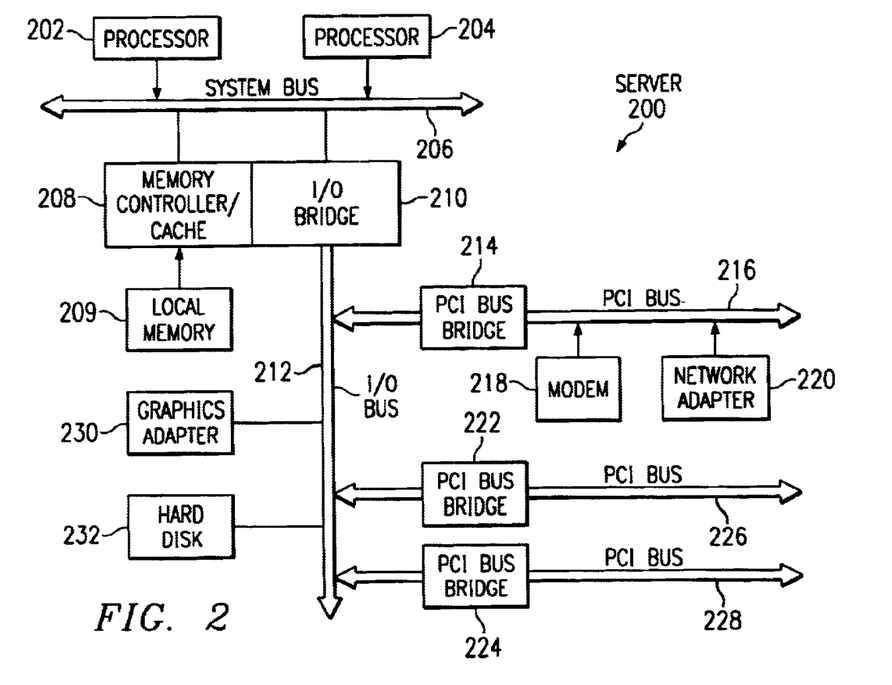
FIG. 2 depicts a block diagram of a data processing system that may be implemented as a server in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 maybe integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
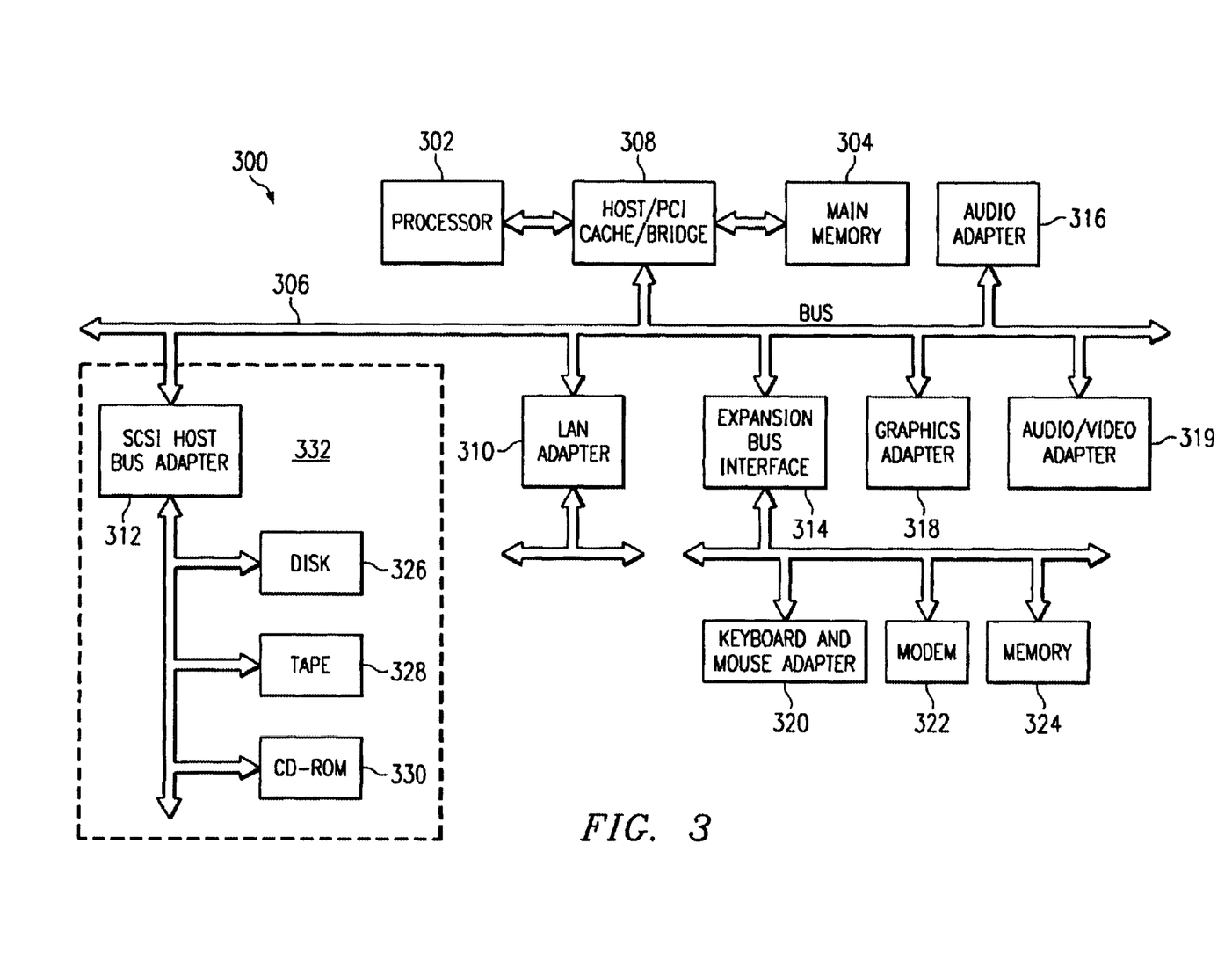
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations.

The present invention provides a method, apparatus, and instructions for searching for files or documents using a graphical user interface. In particular, the present invention provides a graphical user interface thread and a search thread in which both threads execute to perform searching and presentation of searches to a user. The search thread is used to handle the searching and processing of files while the graphical user interface thread allows the user to interact with the graphical user interface while files are being processed by the search thread.

Figure 4:
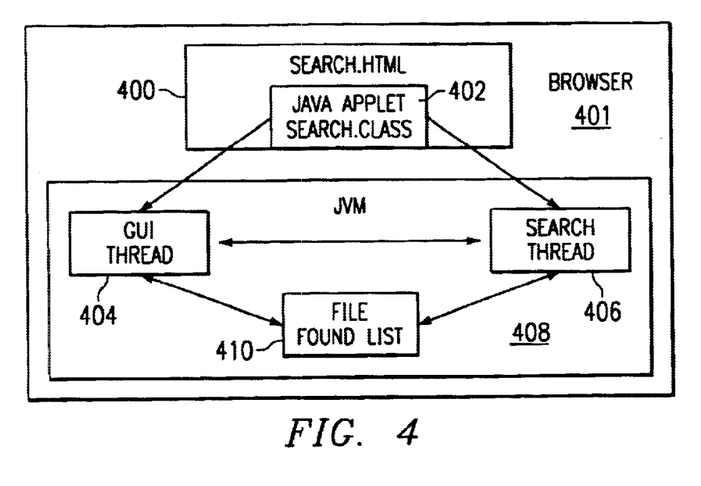
FIG. 4 is a block diagram illustrating components used in searching for documents depicted in accordance with a preferred embodiment of the present invention.

With reference now to FIG. 4, a block diagram illustrating components used in searching for documents is depicted in accordance with a preferred embodiment of the present invention. In this example, a search may be initiated through an HTML page such as search page 400 displayed in browser 401 in which a Java applet 402 containing code used to initiate search threads is contained. Search page 400 may be located locally on a client or downloaded from a server. Initiation of Java applet 402 causes the initiation of one thread, GUI thread 404. In this example, GUI thread 404, initiates search thread 406 to search for documents meeting the parameters of the search class entered through search page 400. These two threads execute within JVM 408. In accordance with the preferred embodiment of the present invention, GUI thread 404 and search thread 406 run in parallel.

GUI thread 404 is used to provide for interaction with the user while search thread 406 is employed to actually perform the search and file processing.

This combination of threads allows a user to interface and see results while the search is still in progress. The interface for seeing results found thus far are provided through GUI thread 404. Search thread 406 provides for the continued searching while the user views results found thus far through GUI thread 404. The results are written into file found list 410 by search thread 406. GUI thread 404 may access file found list 410 to obtain results already found for display to the user. In the depicted examples, file found list 410 is an array in the form of an object cached in memory allocated by JVM 408 from a heap associated with JVM 408. The file list may be stored in other places, for example a storage device such as a hard disk drive. GUI thread 404 will display the results within browser 401 as a page and actually may display the results within search page 400. Additionally, the user may terminate a search through GUI thread 404, which causes GUI thread 404 to terminate search thread 406. Additionally, search thread 406 also terminates when no more files are present for searching.

Figure 5:
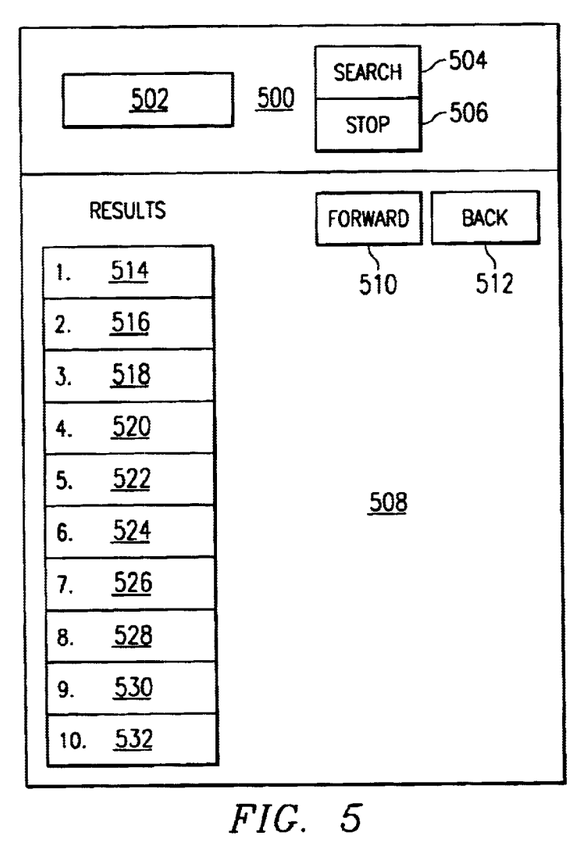
FIG. 5 is an example of a page presented to a user for searching, depicted in accordance with a preferred embodiment of the present invention.

With reference now to FIG. 5, an example of a page presented to a user for searching is depicted in accordance with a preferred embodiment of the present invention. Page 500 is an example of a search page, such as search page 400 in FIG. 4. This search page may be displayed within browser 401, as part of browser 401, or may be displayed as a separate window depending on the implementation. Page 500 includes a parameter field 502 for entering search terms. The search may be initiated by selecting search button 504. The search may be stopped by selecting stop button 506. The results are displayed in section 508, which includes a forward button 510 and a back button 512 to step through the different results returned by the search. Files or documents meeting the search term or terms entered into parameter field 502 will displayed in section 508. In many cases, not all of the search results are displayable within field 500. As a result, groups of results may be displayed and the results may be viewed by depressing forward button 510 and back button 512. When the search is first initiated, search thread 406 in FIG. 4 will search for the appropriate files locally or at some URL. In the depicted examples, when results are returned they will be displayed in section 508. GUI thread 404 in FIG. 4 will continue to update page 500 until no more results are displayable in section 508. At that time, forward button 510 will be selectable by the user. In this manner, the user is able to view results while the search continues by search thread 406 in FIG. 4. Selecting stop button 506 will result in GUI thread 404 terminating search thread 406 back in FIG. 4. In this example, section 508 is able to display ten results, results 514–532.

Figure 6:
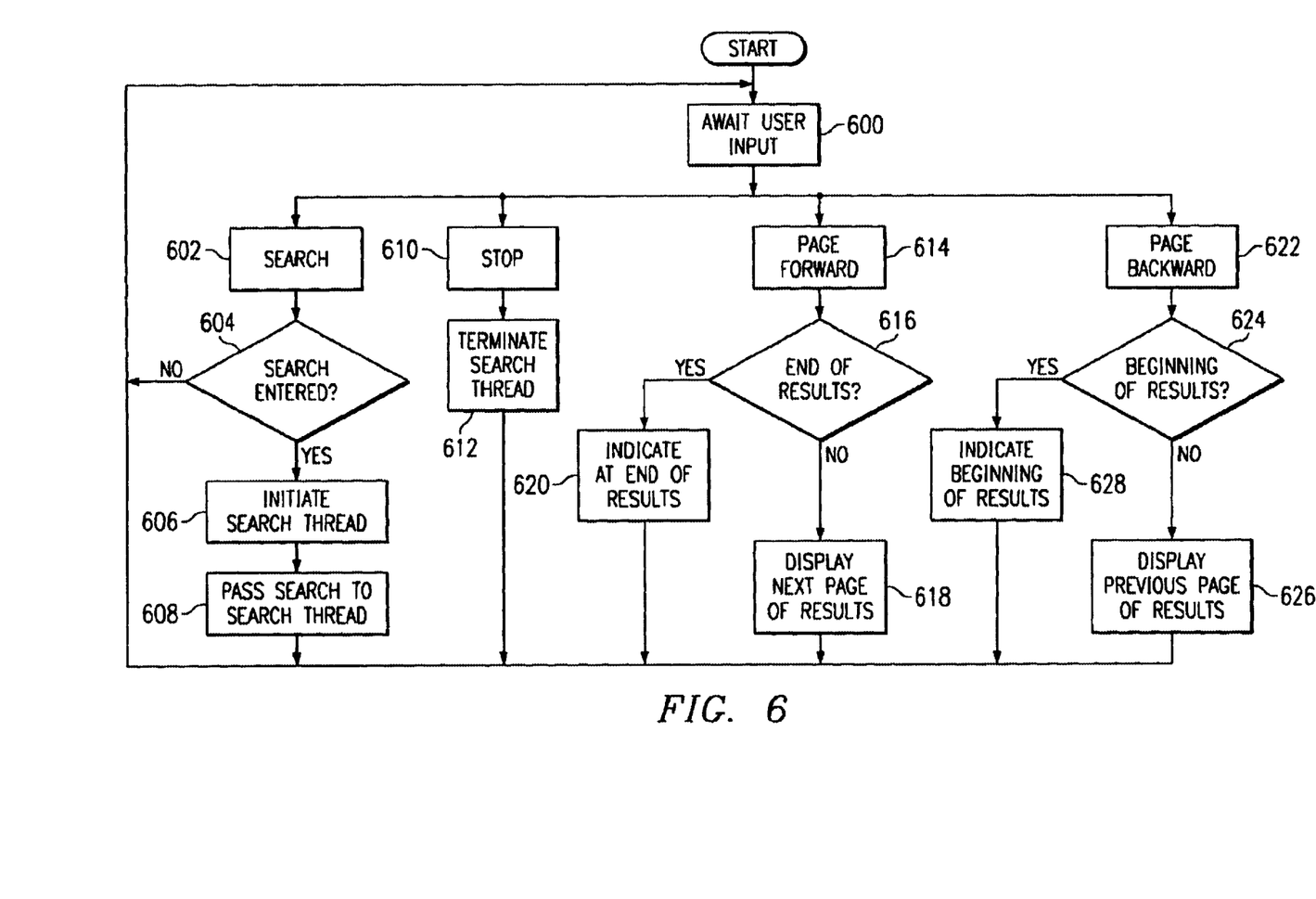
FIG. 6 is a flowchart of a process used by a graphical user interface to process inputs depicted in accordance with a preferred embodiment of the present invention.

With reference now to FIG. 6, a flowchart of a process used by a graphical user interface to process inputs is depicted in accordance with a preferred embodiment of the present invention. This process is used to process inputs made through the graphical user interface. In particular, the process checks for various GUI button interactions.

The process begins by awaiting user input (step 600). Upon receiving an input by the user to initiate a search (step 602), a determination is made as to whether a search has been entered in the GUI (step 604). If a search has been entered, then the search thread is initiated (step 606). Thereafter, the search is passed to a search thread (step 608) with the process then returning to step 600 to await additional user input.

With reference again to step 604, if a search has not been entered, the process returns to step 600.

In response to receiving input in which the user has pressed the stop button (step 610), the search thread is then terminated (step 612) with the process then returning to step 600.

If the input to the graphical user interface is pressing of the page forward button (step 614), a determination is made as to whether the end of the results have been displayed (step 616). If the end of the results has not been reached in the display, the next page of results is then displayed (step 618) with the process then returning to step 600. Otherwise, an indication is made in the GUI to indicate to the user that the user is at the end of the results (step 620) with the process then returning to step 600.

In response to receiving input pressing the page backward button (step 622), the process then makes a determination as to whether the display of the results is at the beginning of the results (step 624). If the display is not at the beginning of the results, then the previous page of results is then displayed to the user (step 626) with the process then returning to step 600. Otherwise, an indication is made to the user that the display is at the beginning of the results (step 628) with the process then returning to step 600.

Figure 7:
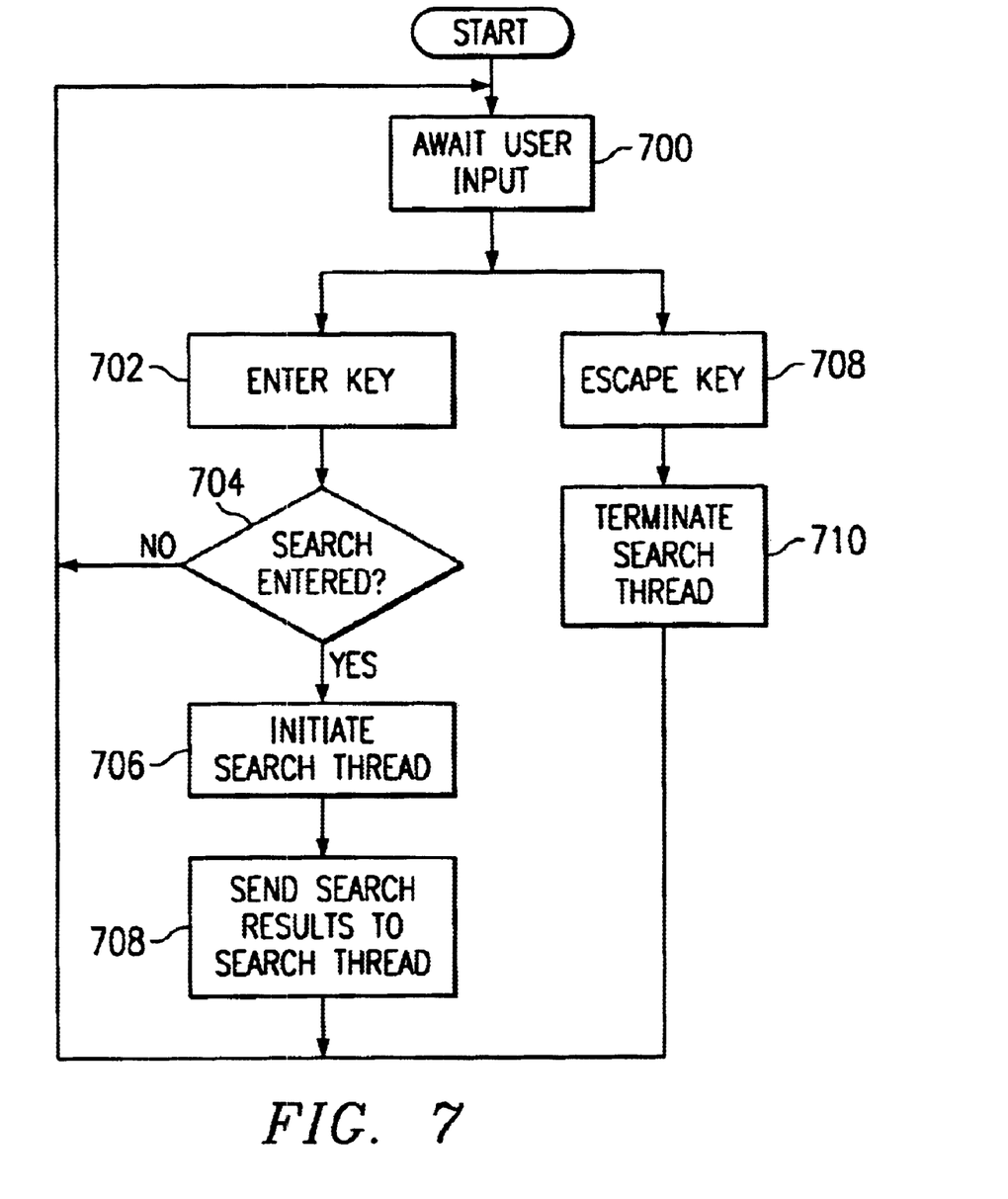
FIG. 7 is a flowchart of a process for handling user input by a graphical user interface thread depicted in accordance with a preferred embodiment of the present invention.

With reference now to FIG. 7, a flowchart of a process for handling user input by a graphical user interface thread is depicted in accordance with a preferred embodiment of the present invention. The process illustrated in FIG. 7 is that for handling a keyboard event. In the depicted examples, the keyboard events handled are an enter key and an escape key.

The process begins by awaiting user input (step 700). Upon receiving user input of an enter key being depressed on the keyboard (step 702), a determination is made as to whether a search has been entered (step 704). If a search has not been entered, the process returns to step 700. Otherwise, the search thread is initiated (step 706), and the search is sent to the search thread (step 708) with the process then returning to step 700.

Upon receiving an input of the depression of a escape key (step 708), the search thread is terminated (step 710) with the process then returning to step 700.

Figure 8:
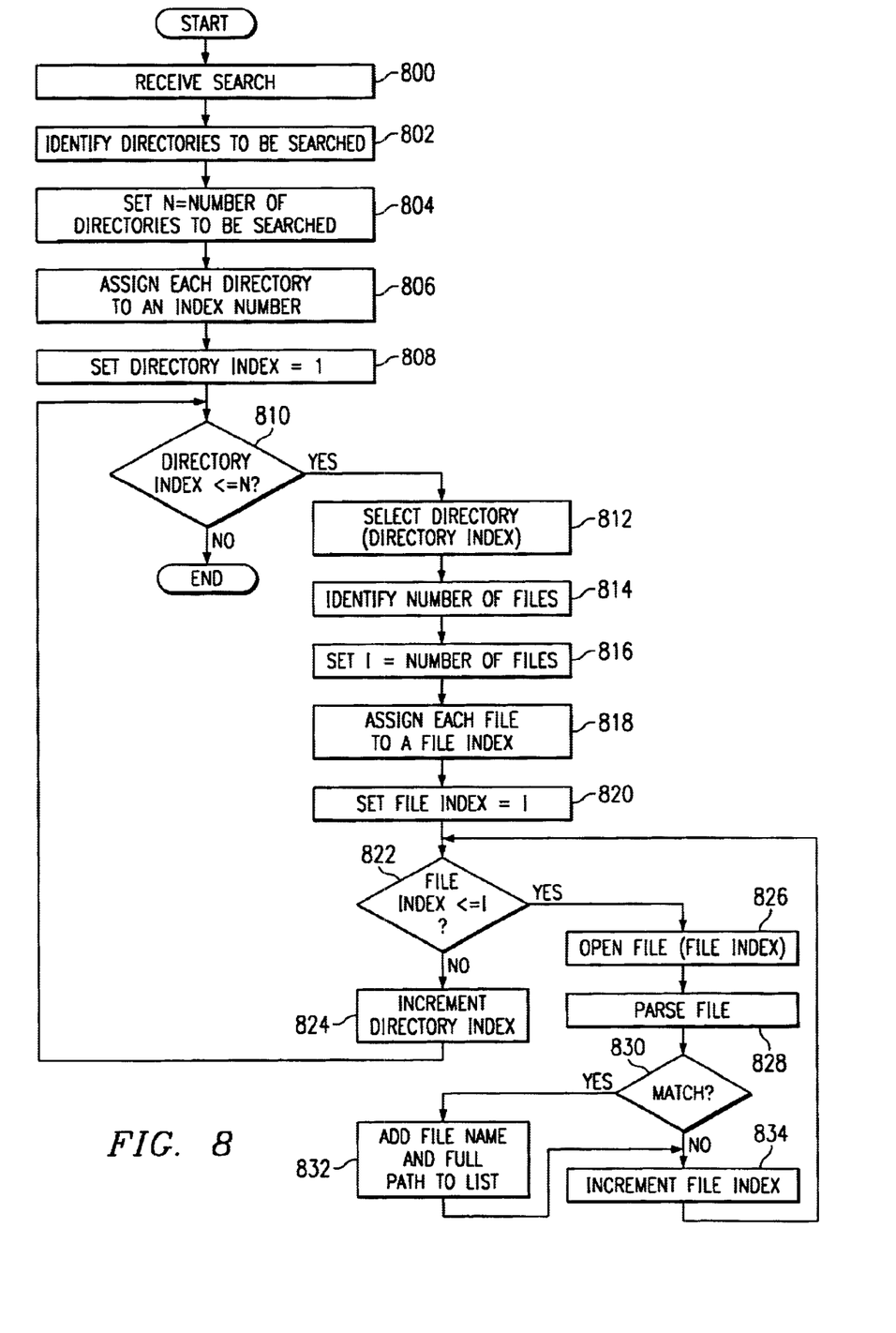
FIG. 8 is a flowchart of a process used by a search thread to search for files depicted in accordance with a preferred embodiment of the present invention.

With reference now to FIG. 8, a flowchart of a process used by search thread to search for files is depicted in accordance with a preferred embodiment of the present invention. The process begins by receiving a search (step 800). In this example, the search to be made is received from the graphical user interface thread. Thereafter, directories to be searched are identified (step 802). In this case, the directories may be identified in a number of different ways. For example, directories may be selected for searching or the entire disk may be searched. This identification will include any subdirectories if it is desired to search subdirectories. Thereafter, a variable N is set equal to the number of directories to be searched (step 804).

Each directory is assigned to an index number numbered from one to N (step 806). Next, a directory index is set equal to one (step 808). A determination is then made as to whether the directory index is less than or equal to N (step 810). If the directory index is not less than or equal to N, the process terminates. In this situation, all of the directories have been searched. Otherwise, a directory is selected based on the directory index, which will be one for the first search (step 812). Thereafter, the number of files present in the directory is identified (step 814). The variable I is set equal to the number of files in the directory (step 816). Each file is then assigned to a file index in a manner similar to that for the directories (step 818). Then, a file index is set equal to one (step 820). A determination is then made as to whether the file index is less than or equal to I (step 822). If the file index is not less than or equal to I, then the directory index is incremented (step 824) with the process returning to step 810. Such a situation indicates that either no files are present or all of the files have been processed within the directory.

If the file index is less than or equal to I, then the file indicated by the file index is then open (step 826). The open file is then parsed (step 828). A determination is made as to whether a match is present for the search terms in the files (step 830). If a match is present, the file name and the full path is added to a file list (step 832). Thereafter, the file index is incremented (step 834) with the process then returning to step 822 as described above. If no match is found in step 830, the process proceeds to step 834 to increment the file index and to look for the next file if any in step 822.

The search thread described in FIG. 8 also may be applied to searching on the World Wide Web. In such a case, files on hosts or Web servers are specified by a Universal Resource Locator (URL), such as HTTP://ibm.com/find/this/dir/file.* in which "*" may be anything. Alternatively, a URL directory, such as HTTP://ibm.com/find/this/dir, in which the file may be found may be stored in association with the name of the file in the directory. If a match is found while searching a host on the World Wide Web, the URL will be added to the file found list. If a match is not found, then the next file in the URL's directory will be searched until no more files are present for searching. At that time, the thread will terminate.

Figure 9:
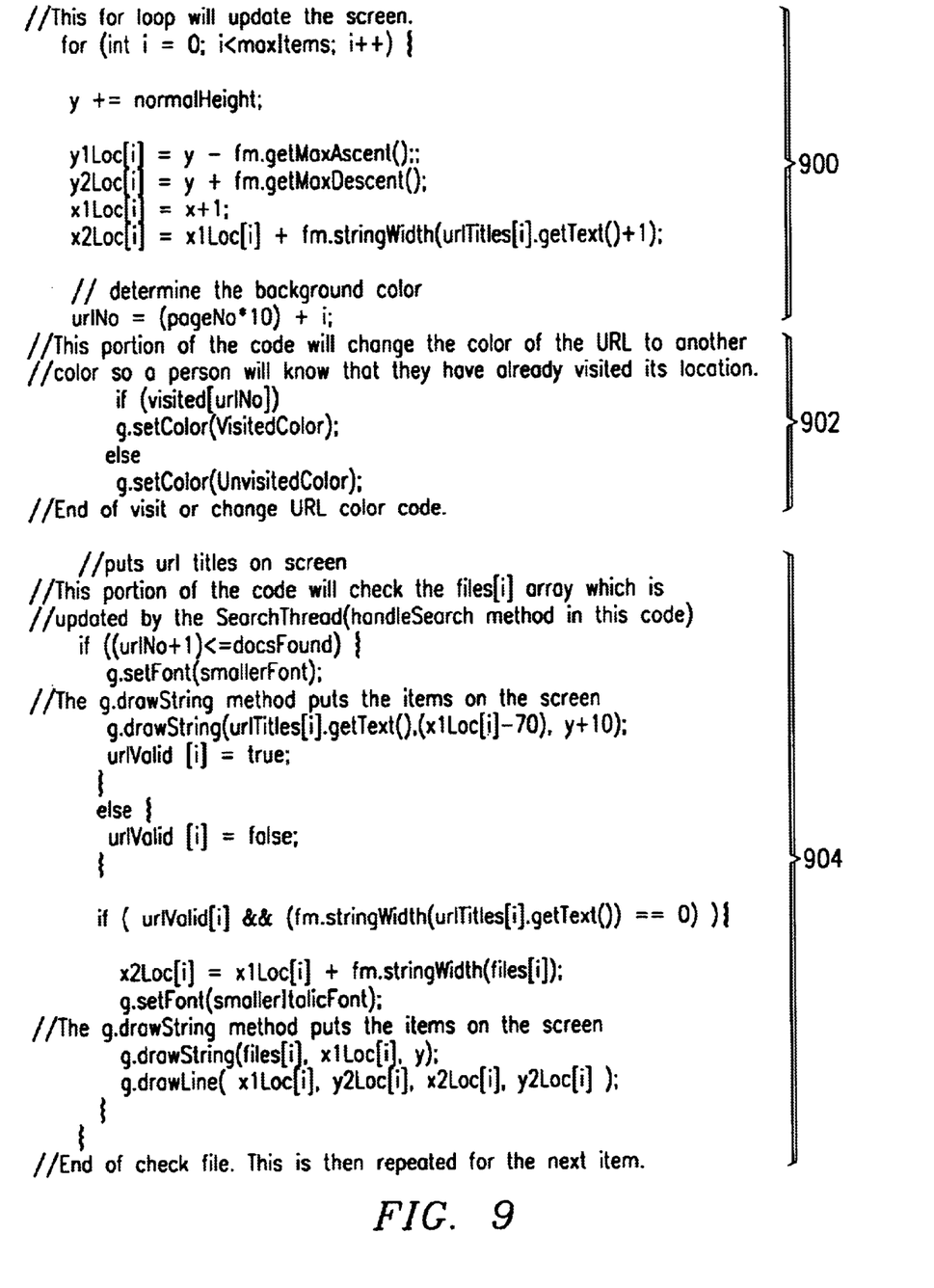
FIG. 9 is a diagram illustrating pseudo code for displaying file names on a GUI depicted in accordance with a preferred embodiment of the present invention.

FIGS. 9, 10A, 10B, 11A, and 11B are psuedo code examples for processes and the present invention and are written in Java. With reference now to FIG. 9, a diagram illustrating pseudo code for displaying file names on a GUI is depicted in accordance with a preferred embodiment of the present invention. In section 900, the code is used to update the screen. Section 902 is employed to change the color of the URL to another color if the URL is one that has already been visited. The code in section 904 is used to check the files in the array for the file found list for files not already displayed on the list.

Figure 10A:
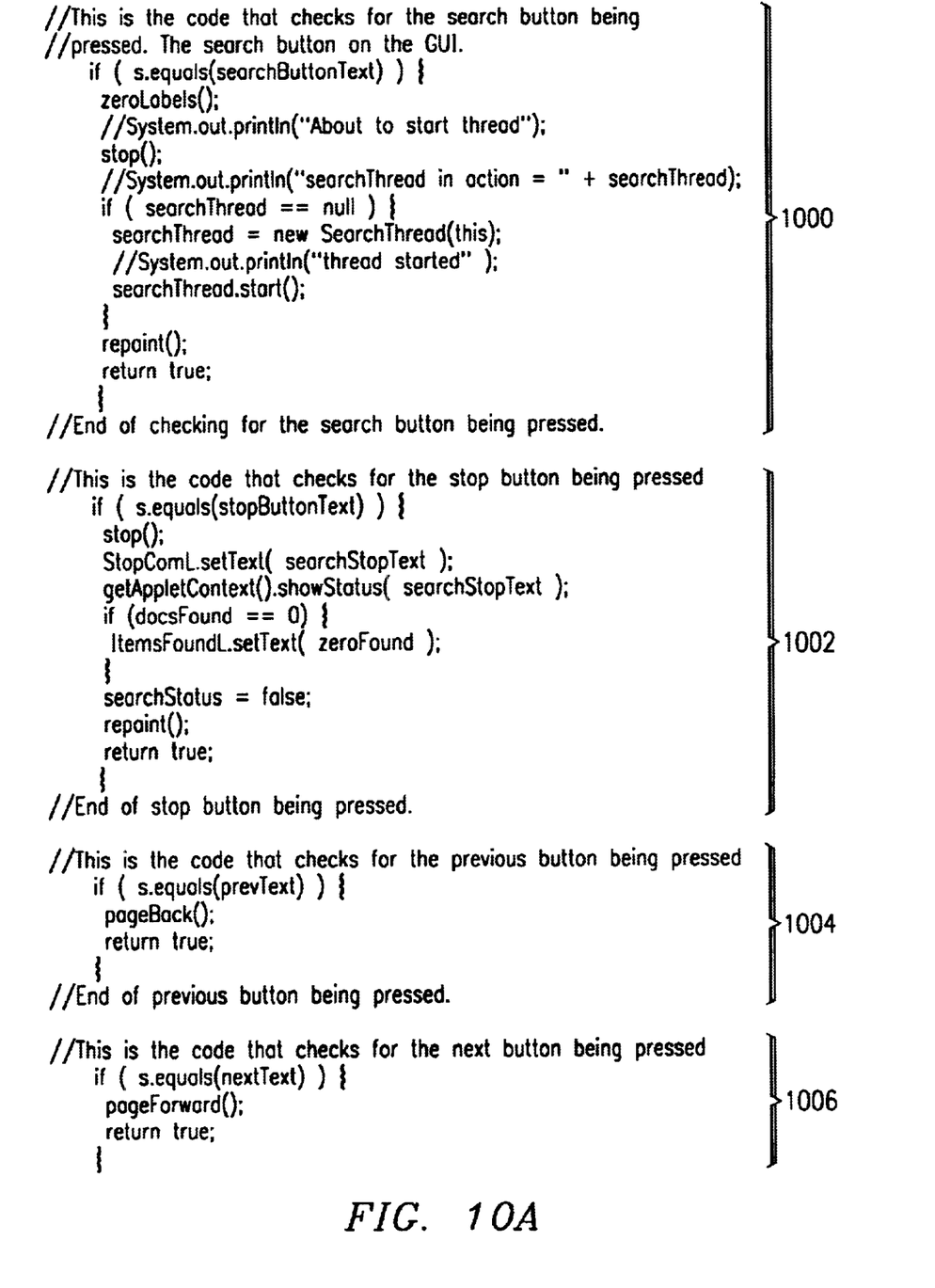
FIGS. 10A and 10B are diagrams illustrating pseudo code for handling GUI button interactions depicted in accordance with a preferred embodiment of the present invention.
Figure 10B:
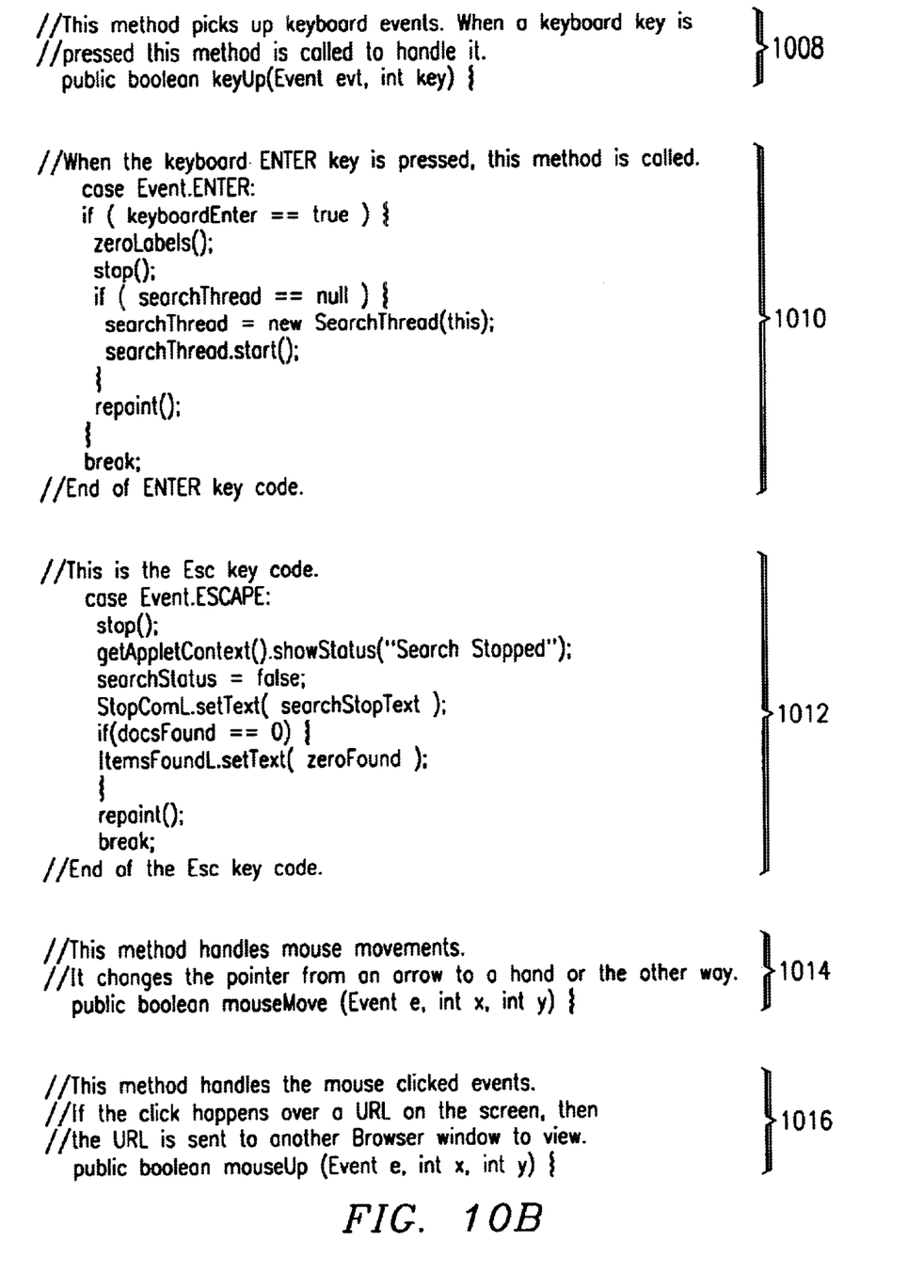

With reference now to FIGS. 10A and 10B, diagrams illustrating pseudo code for handling GUI button interactions are depicted in accordance with a preferred embodiment of the present invention. In section 1000 in FIG. 10A, the code is used to initiate the search in response to depressing or selection of a search button. This code will initiate the search thread. Next, section 1002 illustrates code to terminate a search when a stop button is selected by user. Section 1004 includes code used to process the selection of a page forward button. This initiates the movement to the next page. Section 1006 illustrates a code used for a page back button. Section 1008 in FIG. 10B contains code for identifying certain keyboard events. In this example, section 1010 illustrates the pseudo code used to process depressing of an enter key. Depressing an enter key will cause the code in section 1010 to initiate a search thread. Next, section 1012 will initiate determination of a search thread when the escape key is pressed. Section 1014 contains code used to handle mouse movements while section 1016 handles code to use the pressing or releasing of a mouse button.

Figure 11A:
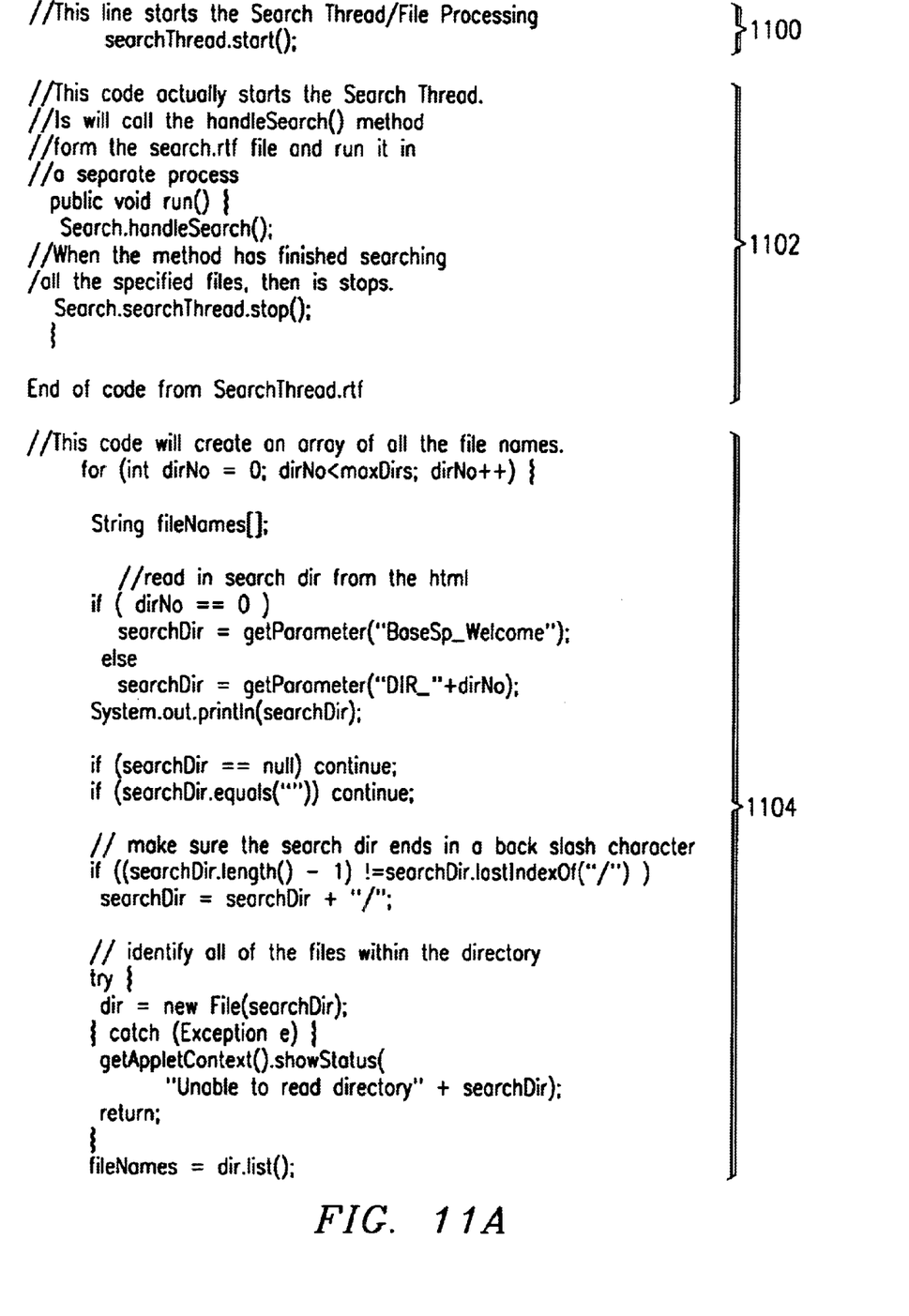
FIGS. 11A and 11B are diagrams illustrating pseudo code for a search thread depicted in accordance with a preferred embodiment of the present invention.
Figure 11B:
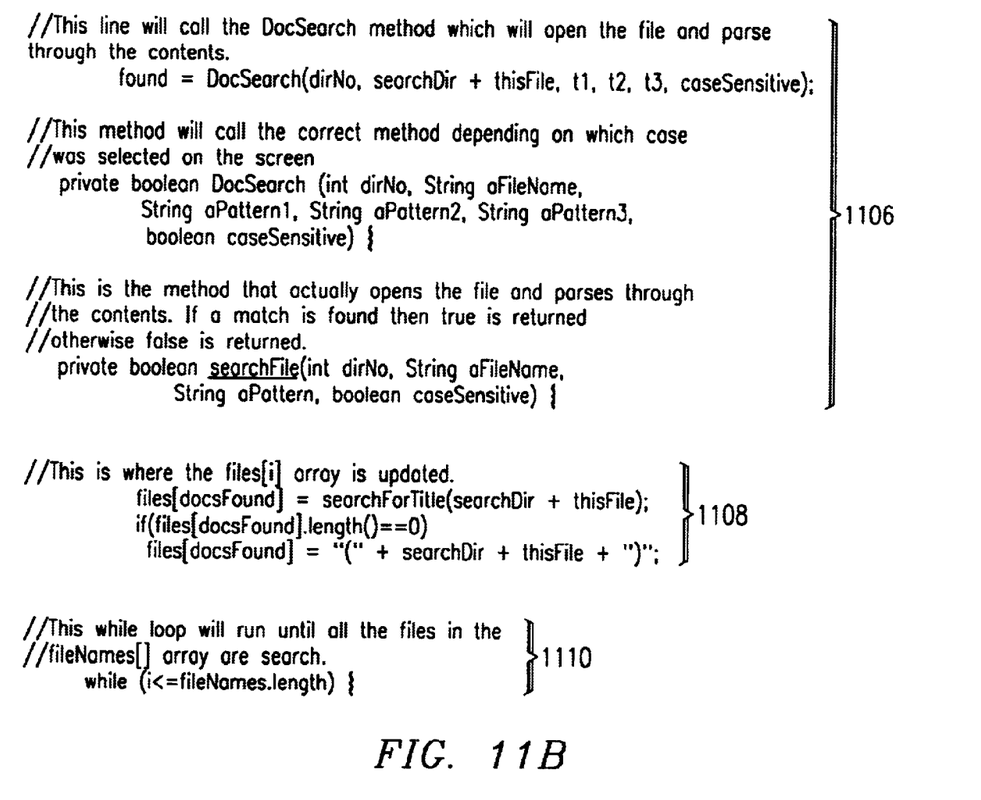

With reference now to FIGS. 11A and 11B, diagrams illustrating pseudo code for a search thread are depicted in accordance with a preferred embodiment of the present invention. This search thread is initiating a response to the selection or depressing of a search button in the GUI or the pressing of an enter button from the keyboard. In FIG. 11A, section 1100 is used to initiate the start of the search thread. Section 1102 indicates code for starting the search thread. Section 1104 illustrates code used to select or locate files based on a full path and filename. This example illustrates searching for files locally while the present invention also may be applied to searching for files remotely from the data processing system. For example, the code also may be applied to searching for files on the World Wide Web specified by a URL or by searching for URL directories in which files may be found.

Section 1106 in FIG. 11B illustrates code that is used to open and parse through the contents of a file. This code will compare the contents of the file with the search word or words and will check all specified files before it stops. This code in section 1106 may be terminated by the pressing of a stop button as detected by the GUI thread. Section 1108 contains code used to add the full path and filename or the URL to a file found list. Section 1110 is used to initiate parsing or searching of the next file.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. In the depicted examples, the two concurrent threads are executed within a Java virtual machine. The processes of the present invention may be applied to other types of threads other than those from a Java applet executed within a virtual machine other than a JVM or within an operating system, such as Windows 95, which is available from Microsoft Corporation. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for processing search requests comprising the data processing system implemented steps of:

receiving a search request;

initiating a first thread, wherein the first thread provides an interface with a user to manipulate the results returned by a second thread and wherein the first thread and the second thread execute in parallel in the data processing system; and initiating the second thread, wherein the second thread performs a search using the search request and stores the results of the search in a data structure, wherein the second thread sends a signal to the first thread each time a result is obtained from the search and wherein the interface thread examines the data structure each time the signal is received from the search thread and updates the presentation of the results, and wherein the results returned by the second thread may be manipulated, using the interface provided by the first thread, while the second thread is executing.

2. The method of claim 1, wherein the first thread and the second thread are executed by a Java virtual machine.

3. The method of claim 1, wherein the second thread is initiated by an applet.

4. The method of claim 3, wherein the applet is associated with a web page.

5. The method of claim 1, wherein the search is performed to search for content on a hard disk drive in the data processing system.

6. The method of claim 3, wherein the second thread is initiated by the first thread.

7. The method of claim 1, wherein the results include documents.

8. The method of claim 1, wherein the search is performed to search for content on a server in communication with the data processing system.

9. The method of claim 1, wherein the search results are paths and file names.

10. The method of claim 1, wherein the search results are universal resource locators.

11. The method of claim 1, wherein the first thread displays the results using a hypertext markup language document.

12. A data processing system for processing search requests comprising:

receiving means for receiving a search request;

first initiating means for initiating a second thread, wherein the first thread provides an interface with a user to manipulate the results returned by the second thread and wherein the first thread and the second thread execute in parallel in the data processing system; and second initiating means for initiating a second thread, wherein second thread performs a search using the search request and stores the results of the search in a data structure, wherein the second thread sends a signal to the first thread each time a result is obtained from the search and wherein the interface thread examines the data structure each time the signal is received from the search head and updates the presentation of the results, and wherein the results returned by the second thread may be manipulated, using the interface provided by the first thread, while the second thread is executing.

13. The data processing system of claim 12, wherein the first thread and the second thread are executed by a Java virtual machine.

14. The data processing system of claim 12, wherein the first thread is initiated by an applet.

15. The data processing system of claim 14, wherein the applet is associated with a web page.

16. The data processing system of claim 12, wherein the search is performed to search for content on a hard disk drive in the data processing system.

17. The method of claim 12, wherein the second thread is initiated by the first thread.

18. The method of claim 12, wherein the results include documents.

19. The data processing system of claim 12, wherein the search is performed to search for content on a server in communication with the data processing system.

20. The data processing system of claim 12, wherein the search results are paths and file names.

21. The data processing system of claim 12, wherein the search results are universal resource locators.

22. The data processing system of claim 12, wherein the first thread displays the results using a hypertext markup language document.

23. The search application of claim 21, wherein the interface thread terminates the search thread in response to receiving an input from the interface to stop the search.

24. The search application of claim 21, wherein the search thread sends a signal to the interface thread each time a result is obtained from the search.

25. The search application of claim 22, wherein the search application is an applet.

26. The search application of claim 22, wherein the search is performed to search for content on a hard disk drive in the data processing system.

27. The search application of claim 22, wherein the search is performed to search for content on a server in communication with the data processing system.

28. The search application of claim 26, wherein the search results are paths and file names.

29. The search application of claim 26, wherein the search results are universal resource locators.

30. A search application for use in a data processing system, the search system comprising:

a search thread, wherein the search thread, responsive to receiving a search request, executes a search of a selected site using a search request and then stores results of the search in a data structure;

an interface thread, wherein the interface thread provides a presentation of the results of the search stored in the data structure on a display to a user, provides an interface to receive the search request from a user, and responsive to receiving the request from the user, initiates the search thread; and wherein the interface thread and the search thread execute in parallel in the data processing system, wherein the search thread sends a signal to the interface thread each time a result is obtained from the search, wherein the interface thread examines the data structure each time the signal is received from the search thread and updates the presentation of the results, and wherein the results returned by the search thread may be manipulated, using the interface provided by the interface thread, while the search thread is executing.

31. A computer program product in a computer readable medium for processing search requests comprising:

first instructions for receiving a search request;

second instructions for initiating a first thread, wherein the first thread provides an interface with a user to manipulate the results returned by the first thread; and third instructions for initiating a second thread, wherein the second thread performs a search using the search request and stores the results of the search in a data structure and wherein the first thread and the second thread execute in parallel in the data processing system, wherein the second thread sends a signal to the first thread each time a result is obtained from the search and wherein the interface thread examines the data structure each time the signal is received from the search thread and updates the presentation of the results, and wherein the results returned by the second thread may be manipulated, using the interface provided by the first thread, while the second thread is executing.

* * * * *

UNITED STATES PATENT AND TRADEMARK OFFICE
CERTIFICATE OF CORRECTION

PATENT NO.    : 6,633,864 B1
DATED         : October 14, 2003
INVENTOR(S)   : Christensen et al.

It is certified that error appears in the above-identified patent and that said Letters Patent is hereby corrected as shown below:

Column 2,
Line 15, after "JAVA" delete "#" and insert -- TM --.

Column 11,
Line 31, after "search" delete "head" and insert -- thread --.
Line 45, after "17. The" delete "method" and insert -- data processing system --.
Line 47, after "18. The" delete "method" and insert -- data processing system --.
Line 59, after "claim" delete "21" and insert -- 30 --.

Column 12,
Line 1, after "claim" delete "21" and insert -- 30 --.
Lines 4, 6 and 9, after "claim" delete "22" and insert -- 24 --.

Signed and Sealed this

Twenty-fourth Day of January, 2006

JON W. DUDAS
*Director of the United States Patent and Trademark Office*